K. E. DEUSSEN.
SPRING SUSPENSION DEVICE FOR VEHICLES.
APPLICATION FILED APR. 8, 1910.

969,463.

Patented Sept. 6, 1910.

Witnesses:
Thomas Donnellan.
Corinne Myers.

Inventor
Karl Edmund Deussen.
by L. K. Böhm
Attorney

UNITED STATES PATENT OFFICE.

KARL EDMUND DEUSSEN, OF BERLIN, GERMANY.

SPRING SUSPENSION DEVICE FOR VEHICLES.

969,463.  Specification of Letters Patent.  Patented Sept. 6, 1910.

Application filed April 8, 1910. Serial No. 554,115.

*To all whom it may concern:*

Be it known that I, KARL EDMUND DEUSSEN, a subject of the King of Prussia, and resident of 31 Lippehnerstrasse, Berlin, German Empire, have invented a new and useful Spring Suspension Device for Vehicles, of which the following is a specification.

This invention relates to an improved spring suspension device for vehicles.

According to this invention the frame of the vehicle is supported on the axles by rotatable bearings which are each connected to the frame by means of two levers one arranged on each side of the corresponding axle, one end of each lever being pivoted to said frame, while the other ends are pivoted to said bearing at diametrically opposite points so that when the distance between said frame and said axle is diminished said levers are caused to rotate in opposite directions, elastic means being employed for simultaneously controlling to an equal degree the rotation of each of said levers. In carrying the invention into effect the levers are preferably made in the form of bell-crank levers the substantially horizontal arms of which are connected to the bearing and the substantially vertical members connected together by a spring. Means may be provided for adjusting the tension of the spring devices and also for varying the leverage of such spring devices.

Figure 1:
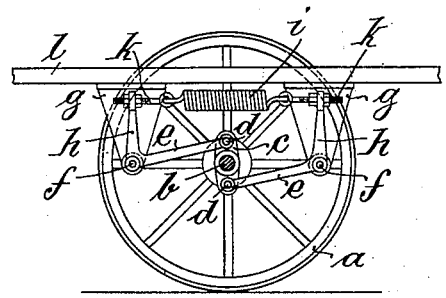
Figure 2:
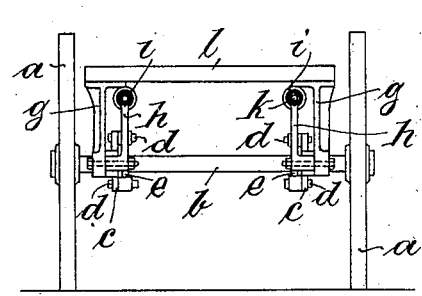
Figure 3:
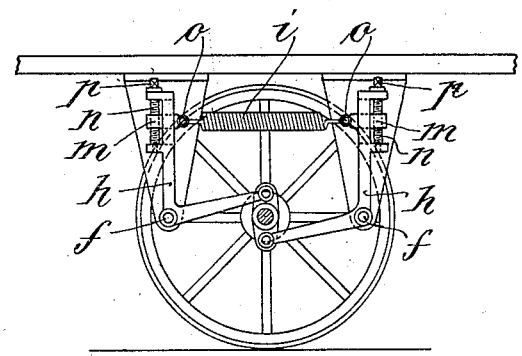

One construction of spring suspension device according to the present invention is illustrated as applied to a road vehicle in the accompanying drawing in which:

Figure 1 is a broken sectional side elevation and Fig. 2 an end elevation of the vehicle, and Fig. 3 is a view similar to Fig. 1 showing means for varying the leverage of the spring.

Referring to Figs. 1 and 2 the frame $l$ of the vehicle is supported on the axle $b$ of the wheels $a$ by a bearing $c$ capable of rotating about the axle $b$. The bearing $c$ is connected to the frame $l$ by two equal arms $e$ one end of each of which is pivoted at $f$, $f$ to brackets $g$ secured to the frame $l$ on opposite sides of the axle $b$ while the other ends are pivoted to the bearing $c$. As shown the arms $e$ form one arm of bell crank levers, the other equal arms $h$ of which are connected by a single spiral spring $i$. In order to permit of the adjustment of the tension of the spring $i$ this spring is connected to the arms $h$ by means of eye bolts $k$ screwed into the arms $h$. When the distance between the frame and the axle is diminished by an increase of load or when the wheel encounters an obstruction the centers of the pivots $f$ are lowered vertically with respect to the axis of the axle, and since the outer ends of the arms $e$ are constrained to move about the center of the axle $b$, they are both raised so that the bell crank levers rotate in opposite directions and increase the tension upon the spring $i$. With this arrangement it will be observed that no relative longitudinal movement between frame and axle can take place since with both longitudinal and vertical shocks the movement of the axle relatively to the frame is always normal. Further the arrangement is such that the movements of the frame can be reduced to a minimum by suitably designing the length of the lever arms.

It will be understood that the invention is not to be restricted to the use of a single spring as multiple springs may be employed for instance by extending the arms $h$ on the opposite side of the pivots $f$ and providing tension springs connected to the free ends of such extension arms. It will further be understood that the construction of the bearing $c$ and the mode of connecting the free ends of the arms $e$ may be varied. If desired the bearing $c$ may also be made in halves and bolted together.

Not only may the tension of the spring be adjustable as already described but also the leverage of the spring may be arranged so as to be capable of variation. As shown for instance in Fig. 3 the spring $i$ is connected to an eye $o$ formed on a piece $m$ adapted to slide in or over the lever arm $h$ and adjusted by a screw $n$ carried by eyes on the lever arm $h$ and provided for example with a square end $p$ for a spanner.

I claim:—

1. In a vehicle, the combination with the frame and a wheel axle of a rotatable bearing on said axle, two levers one arranged on each side of said axle, each lever having one end pivoted to said frame, while the other ends are pivoted at diametrically opposite points to said bearing, so that, when the distance between said frame and said axle is diminished, said levers are caused to rotate in opposite directions, and elastic means for simultaneously controlling to an equal degree the rotation of each of said levers.

2. In a vehicle, the combination with the frame and a wheel axle of a rotatable bearing on said axle, two levers, one arranged on each side of said axle, each lever having one end pivoted to said frame, while the other ends are pivoted at diametrically opposite points to said bearing, so that, when the distance between said frame and said axle is diminished, said levers are caused to rotate in opposite directions, and adjustable elastic means for simultaneously controlling to an equal degree the rotation of each of said levers.

3. In a vehicle, the combination with the frame and a wheel axle of a rotatable bearing on said axle, two levers, one arranged on each side of said axle, each lever having one end pivoted to said frame, while the other ends are pivoted at diametrically opposite points to said bearing, so that, when the distance between said frame and said axle is diminished, said levers are caused to rotate in opposite directions, elastic means for simultaneously controlling to an equal degree the rotation of each of said levers, and means for varying the leverage of said elastic means.

4. In a vehicle, the combination with the frame and a wheel axle of a rotatable bearing on said axle, two levers, one arranged on each side of said axle, each lever having one end pivoted to said frame, while the other ends are pivoted at diametrically opposite points to said bearing, so that, when the distance between said frame and said axle is diminished, said levers are caused to rotate in opposite directions, adjustable elastic means for simultaneously controlling to an equal degree the rotation of each of said levers, and means for varying the leverage of said adjustable elastic means.

5. In a vehicle, the combination with the frame and a wheel axle of a rotatable bearing on said axle, two bell-crank levers, one arranged on each side of said axle and pivoted to said frame, one arm of each lever being pivoted to said bearing at points equidistant from the center thereof and diametrically opposite, so that, when the distance between said frame and said axle is diminished, said levers are caused to rotate in opposite directions and a spring device connecting the other arms of said levers and adapted to restrain the rotation of said levers.

6. In a vehicle, the combination with the frame and a wheel axle of a rotatable bearing on said axle, two bell-crank levers, one arranged on each side of said axle and pivoted to said frame, one arm of each lever being pivoted to said bearing at points equidistant from the center thereof and diametrically opposite, so that, when the distance between said frame and said axle is diminished, said levers are caused to rotate in opposite directions, a spring device connecting the other arms of said levers and adapted to restrain the rotation of said levers, and means for adjusting the tension of said spring device.

7. In a vehicle, the combination with the frame and a wheel axle of a rotatable bearing on said axle, two bell-crank levers, one arranged on each side of said axle and pivoted to said frame, one arm of each lever being pivoted to said bearing at points equidistant from the center thereof and diametrically opposite, so that, when the distance between said frame and said axle is diminished, said levers are caused to rotate in opposite directions, a spring device connecting the other arms of said levers and adapted to restrain the rotation of said levers, means for adjusting the tension of said spring device and means for varying the leverage of said spring device.

In witness whereof I have hereunto set my hand in the presence of two witnesses.

KARL EDMUND DEUSSEN.

Witnesses:
WOLDEMAR HAUPT,
HENRY HASPER.